United States Patent Office 3,567,728
Patented Mar. 2, 1971

3,567,728
PROCESS FOR THE PREPARATION OF PHENAZINE DI-N-OXIDES AND RELATED COMPOUNDS
James David Johnston, Old Saybrook, and Marwan J. Abuel-haj, Groton, Conn., assignors to Pfizer Inc., New York, N.Y.
No Drawing. Filed July 5, 1968, Ser. No. 742,514
Int. Cl. C07d 51/80
U.S. Cl. 260—267                27 Claims

ABSTRACT OF THE DISCLOSURE

A process for the preparation of phenazine-di-N-oxides which comprises reacting an isobenzofuroxan with a phenol in the presence of a base.

BACKGROUND OF THE INVENTION

This invention relates to a novel synthetic procedure and, more particularly, to a novel method for the preparation of phenazine-di-N-oxides. The compounds prepared by the novel subject process are useful in the control of various pathogenic microorganisms. Quinoxaline-di-N-oxides in general are known to possess Gram-negative antibacterial activity. For instance, several quinoxaline-di-N-oxides bearing 2-alkyl or 2,3-dialkyl groups been described by Lundquist et al., U.S. Pat. 2,626,259, issued Jan. 20, 1953, and by Wiedling, Acta Pathol, et Microbiol. Scand. 22, 379–91 (1945). McIlwain J. Chem. Soc. 322 (1943) and King et al., J. Chem. Soc. 3012 (1949), disclose the antibacterial activity of 2-methyl-3-n-amyl-quinoxaline-di-N-oxide and of several 6-substituted quinoxaline-di-N-oxides, respectively.

SUMMARY OF THE INVENTION

Accordingly, a general organic synthetic method is disclosed for the preparation of the subject compounds which comprises reacting an isobenzofuroxan in the presence of a base with a phenol. The preparative reaction of the present invention may be exemplified as follows:

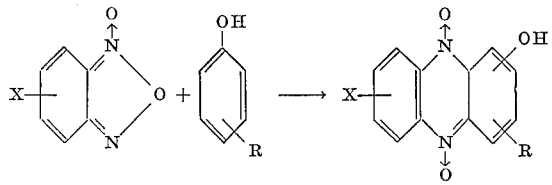

wherein X can be hydrogen and other simple substituents usually found on benzene rings, that is, alkyl, alkoxy, halo, etc. and R can be a substituent such as hydroxy, alkyloxy, halogen (F, Cl, Br, I), alkyl, carboxy, alkyloxycarbonyl, amino, carboxymethoxy, methylenedioxy, etc. In reality, however, the above description is presented in a simple manner for convenience and does not, in fact, encompass all the possible sub-divisions thereof.

To illustrate, the following reaction sequences are examples of particular variations or sub-divisions of the overall reaction mechanism:

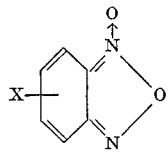

reacted with:

(A) phenol, p-hydroxyphenol or

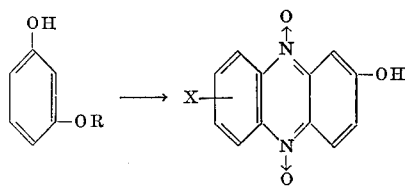

(B) o-hydroxyphenol, 2,4-dihydroxyphenol or 2-hydroxy-4-halophenol

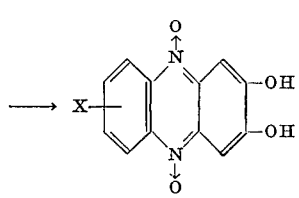

(C) 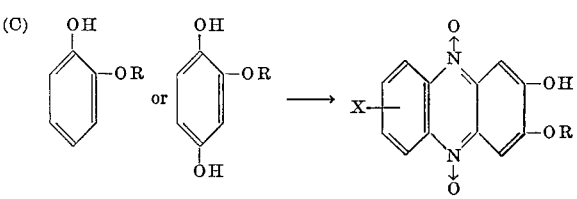

(D) 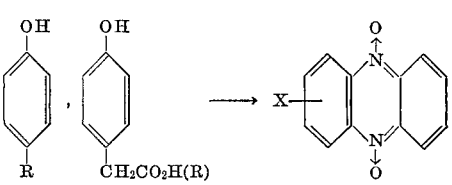

(E) 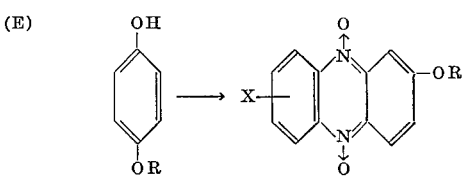

(F) 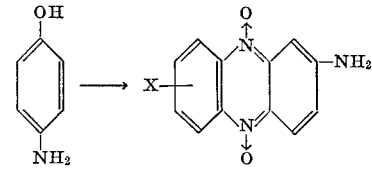

(G) 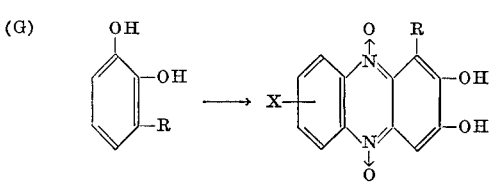

(H) 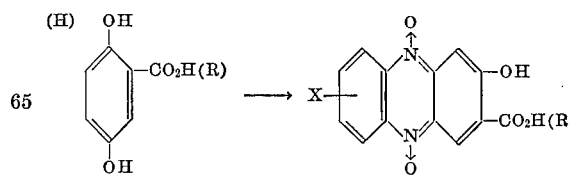

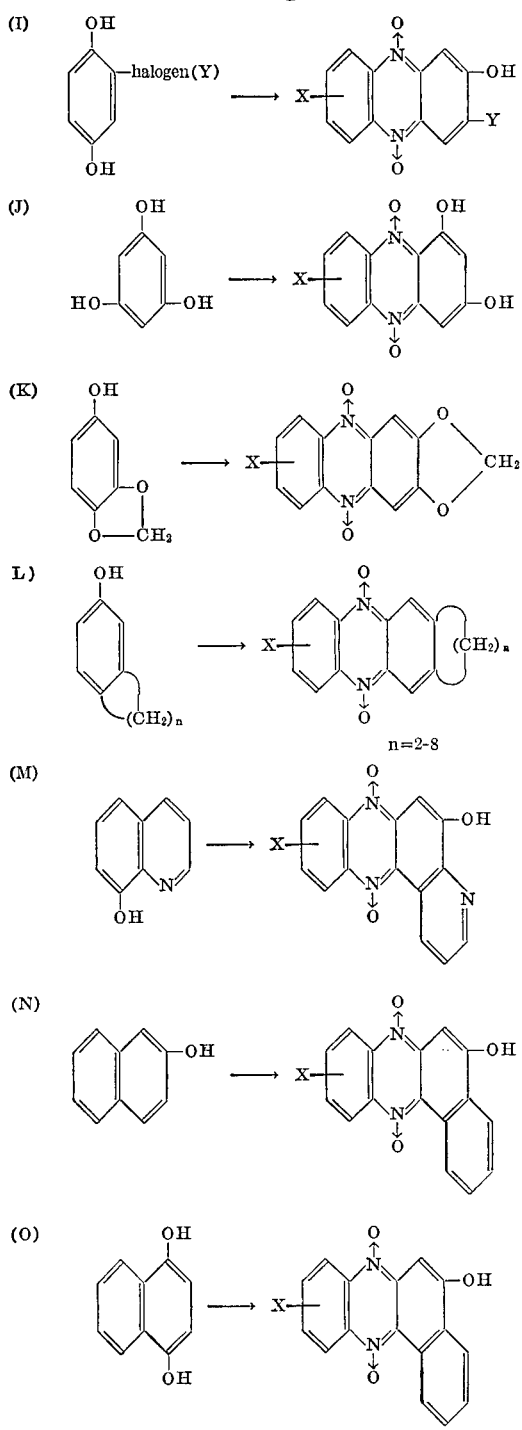

DETAILED DESCRIPTION OF THE INVENTION

Concerning the isobenzofuroxan reagent, also known as benzofuroxan or benzofurazan-oxide, it is found that substituted derivatives will work equally as well as isobenzofuroxan itself. For example, the isobenzofuroxan structure above can be substituted by simple substituents usually found on benzene rings such as alkyl, alkyloxy, halo, etc. Thus, isobenzofuroxan or a substituted isobenzofuroxan may be employed in the process of the present invention. Such compounds are either readily available or easily prepared by one skilled in the art. For instance, an article entitled "The Furoxans," by J. V. R. Kaufman and J. P. Picard in Chemical Review, vol. 59, p. 448 (1959) refers to the preparation of various substituted derivatives.

With respect to the phenol reagent which is utilized in the subject novel process, it is found that in addition to phenol itself, numerous phenol derivatives will also undergo the reaction to provide the desired products. Moreover, in addition to phenol and substituted phenols, compounds such as 8-hydroxyquinoline and hydroxynaphthalenes will also undergo reaction. It must, however, be pointed out that the particular product which one obtains by virtue of this reaction will depend on the type of phenol reagent utilized. For instance, a p-alkyl phenol when reacted will provide the unsubstituted phenazine-di-N-oxide product. The same is true when p-carboxymethylene phenol is used. On the other hand, compounds such as phenol or p-hydroxy phenol when reacted with isobenzofuroxan yield the 2-hydroxyphenazine-di-N-oxide derivative. In like manner, 1,2-dihydroxy phenol derivatives give rise to the 2,3-dihydroxyphenazine-di-N-oxide derivatives; o-methoxy phenol yields 2-hydroxy, 3-methoxyphenazine-di-N-oxide; p-amino phenol yields the 2-aminophenazine-di-N-oxide derivative, etc.

It is therefore apparent by simple inspection that the product which one obtains as well as the ultimate position of the substituent coming from the phenol moiety is dependent upon the particular phenol or phenol derivatives utilized.

As a necessary element of the herein disclosed novel process, the reaction sequences described above must be effected in the presence of a base. Such a base is of varied character. For instance, it is meant to contemplate such bases as organic amines, ammonia, alkali metal hydroxides, hydrides and alkoxides. Although the inclusion of a basic material is a requirement, the type of base used is not critical and the above are only illustrative examples. There is no need, however, to be restricted to this group. Moreover, it has been found that it is more preferable to use certain bases for particular phenol reagents. For instance, it is found that an alkali metal alkoxide such as sodium methoxide is the preferred base when phenol itself is the reagent. Similarly, the same is true for o-hydroxy phenol, 2,4-dihydroxy phenol and 2-hydroxy-4-halo phenols.

The amount of base used in any of the reactions discussed herein is not critical. That is to say, a catalytic amount of base, e.g., perhaps 0.001 to 10% by weight based on the isobenzofuroxan reactant present, in most instances, will work as effectively or as efficiently as an equimolar amount. Of course, there will be instances where the preferred amount of base utilized will be more than a catalytic amount. As will be readily appreciated, the optimum proportion of base will vary with the nature of the particular reactants employed, as well as specific reaction conditions. Accordingly, the optimum proportion of base is most conveniently established by routine experimentation.

As for the inclusion of a solvent in the basic process of this invention, this will not be a critical factor and its desirability will depend on many factors. For instance, if a sizable amount of liquid basic amine is used, there may not be any need to use a solvent. If, however, the reactants when combined produce a viscous system, it is highly desirable to include an appropriate solvent. For purposes of this invention, an appropriate solvent is any solvent which does not react in an undesired way with either the reactants or the final products. One of the advantages in including a solvent is that when certain reflux temperatures are desired, by choosing the appropriate solvent, the desired elevated reaction temperature can be attained. Reaction temperatures do not appear to be critical in the present process although it is generally preferred to carry out the reaction at temperatures above room temperature. A preferred range is from about 30° C. to about 100° C. Temperatures below 30° C. may be employed, for instance, 0° C. to 30° C., but are less preferred.

With regard to the isolation of the desired products of this invention, it is found in many instances that in the course of or upon completion of the reaction the product precipitates out in crystalline form. In such cases, all that is required is filtration, washing and drying. If, on the other hand, the product does not completely precipitate or if it remains in solution, the reaction workup consists of evaporating the mixture almost to dryness and then filtering the product. If the sodium salt of the product forms, as it does in certain instances, the general procedure consists of filtering said salt, dissolving it in water, acidifying the solution and subsequently filtering the product which forms. All of the above techniques are well known to trained technicians working in organic chemical laboratories.

The verification that the herein disclosed compounds are effective antimicrobial agents is established by experimental evaluations. One such in vitro evaluation consists of seeding nutrient broth containing various concentrations of the subject compounds with a particular organism and subsequently determining the "minimum inhibitory concentration" (MIC). The MIC is defined as the minimum concentration of the antimicrobial test compound (in micrograms/milliliter) at which growth of the microorganism fails to occur. For instance, the following is only a representative list of compounds disclosed herein that have exhibited in vitro activity in the above described procedure:

Phenazine-di-N-oxide
2-aminophenazine-di-N-oxide
2,3-dihydroxyphenazine-di-N-oxide
2-hydroxyphenazine-di-N-oxide Illustrative MIC values are shown in the examples. It should be understood that these are only representative illustrations and are provided to show typical desirable results.

Since all of the products of the present invention possess in vitro activity against harmful microorganisms, they are useful as industrial antimicrobials, for instance, water-treatment, slime-control, paint preservation, wood preservation, etc., as well as for topical application purposes, for example, disinfectants, etc. In the latter application, it will often be convenient to compound the selected product with a pharmaceutically-acceptable carrier for ease in application. Thus, for example, they may be blended with vegetable or mineral oils or incorporated in emollient creams. Similarly, they may be dissolved or dispersed in liquid carriers or solvents such as water, alcohol, glycols or mixtures thereof or other reaction-inert media, that is media which have no harmful effect on the active ingredient. For such purposes, it will generally be acceptable to employ concentrations of active ingredients of from about 0.01% to about 10% by weight based on total composition.

Furthermore, the possession of in vitro antimicrobial activity by these compounds allows their utility in the growth promotion of animals, in the control of chronic respiratory disease in poultry, infections sinusitis in turkeys, and urinary tract and systemic and non-systemic infections in animals, including man.

EXAMPLE I 2-hydroxyphenazine-di-N-oxide

To a solution containing phenol (18.8 g., 0.2 M), sodium methoxide (10.8 g., 0.2 M) and tetrahydrofuran (200 ml.) is added benzofurazan-1-oxide (27.2 g., 0.2 M). The mixture is refluxed for about 90 minutes and then allowed to cool. The product which precipitates is filtered and recrystallized from $CF_3COOH/CH_3COOH$, M.P. 209° C. dec.

MIC against *Strep. pyogenes* in 50 mcg./ml.

EXAMPLE II

The procedure of Example I is repeated wherein the following basic materials, in stoichiometric equivalent amounts, are used in place of sodium methoxide together with the solvent indicated to provide comparable results:

Sodium ethoxide-ethanol
Ammonia-benzene
Dimethylamine-chloroform
Diethylamine-dimethyl sulfoxide
Sodium hydroxide-methanol
Potassium hydroxide-methanol
Sodium hydride-dimethylformamide
Morpholine-dimethylacetamide
Pyrrolidine-dimethylformamide
Triethylamine-acetonitrile

EXAMPLE III

The procedure of Example I is repeated wherein molar equivalent amounts of the following isobenzofuroxans are used in lieu of isobenzofuroxan to provide the indicated products:

| Isobenzofuroxan | Product |
|---|---|
| 5-methoxyisobenzofuroxan | 7(or 8)-methoxy-2-hydroxyphenazine-5,10-di-N-oxide. |
| 5-n-butylisobenzofuroxan | 7(or 8)-butyl-2-hydroxyphenazine-5,10-di-N-oxide. |
| 5-bromoisobenzofuroxan | 7(or 8)-bromo-2-hydroxyphenazine-5,10-di-N-oxide. |
| 5-methylisobenzofuroxan | Mixture of 7- and 8-methyl-2-hydroxyphenazine-5,10-di-N-oxide. |

EXAMPLE IV

The same compound as prepared by the procedure of Example I is obtained when a molar equivalent amount of m-methoxyphenol is used in lieu of phenol. In this procedure, however, methanol is used instead of tetrahydrofuran, M.P. 232° C. dec.

*Analysis.*—Calculated for $C_{12}H_8O_3N_2$ (percent): C, 63.15; H, 3.51; N, 12.28. Found (percent) C, 63.22; H, 3.56; N, 12.12.

EXAMPLE V

The same compound as prepared by the procedure of Example I, 2-hydroxyphenazine-di-N-oxide, is obtained when a stoichiometric equivalent amount of p-hydroxyphenol is used in lieu of phenol.

EXAMPLE VI

The same compound as prepared by the procedure of Example I is obtained when a stoichiometric equivalent amount of m-butoxyphenol is used in place of phenol. In this procedure, however, methanol is used instead of tetrahydrofuran.

EXAMPLE VII 2,3-dihydroxyphenazine-di-N-oxide

To a solution of o-hydroxyphenol (11.0 g., 0.1 M) dissolved in 50 ml. of methanol is added sodium methoxide (5.4 g., 0.1 M) dissolved in 100 ml. of methanol over a period of 10 minutes. The resulting solution is stirred at room temperature and isobenzofuroxan (13.6 g., 0.1 M) dissolved in 100 ml. of methanol is then added dropwise at a rate to maintain the temperature at about 40° C. On completion of addition, the mixture is stirred for 3 hours and filtered. The mother liquor is acidified with 2 N HCl, stirred and the solid product isolated by filtration. Recrystallization from trifluoroacetic acid-acetic acid yields the crystalline product, M.P. more than 370° C.

*Analysis.*—Calculated for $C_{12}H_8O_4N_2$ (percent): C, 59.02; H, 3.30; N, 11.47. Found (percent): C, 58.57; H, 3.34; N, 11.47.

MIC against *Past. multocida* is 100 mcg./ml.

EXAMPLE VIII

The procedure of Example VII is repeated wherein a molar equivalent amount of 2,4-dihydroxyphenol is used in place of o-hydroxyphenol with comparable results.

EXAMPLE IX

The procedure of Example VII is repeated wherein the following 2 - hydroxy-4-halophenols, in stoichiometric equivalent amounts, are used in lieu of o-hydroxyphenol to provide equivalent results:

2-hydroxy-4-fluorophenol
2-hydroxy-4-chlorophenol
2-hydroxy-4-bromophenol

EXAMPLE X 2-methoxy-3-hydroxyphenazine-di-N-oxide

A solution containing o-methoxyphenol (5.0 g., 0.04 M), isobenzofuroxan (5.4 g., 0.04 M) and sodium methoxide (2.16 g., 0.04 M) in 100 ml. of methanol is allowed to stand at room temperature for 96 hours. It is then warmed to reflux temperatures until a U.V. spectrum of the reaction mixture indicates that all the isobenzofuroxan has reacted. The solution is then acidified with concentrated HCl and filtered to give 4.0 g. (39%) of an orange solid which is recrystallized from an acetic acid-ether mixture, M.P. 225° C. dec.

Analysis.—Calculated for $C_{13}H_{10}N_2O_4$ (percent): C, 60.42; H, 3.90; N, 10.85. Found (percent): C, 59.62; H, 4.14; N, 11.12.

EXAMPLE XI

The procedure of Example X is repeated wherein molar equivalent amounts of the phenol reagent listed herein below is used in place of o-methoxyphenol to provide the indicated product. Comparable results are obtained.

| Phenol reagent | Product |
|---|---|
| o-Ethoxyphenol | 2-ethoxy-3-hydroxyphenazine-di-N-oxide. |
| o-Butoxyphenol | 2-butoxy-3-hydroxyphenazine-di-N-oxide. |

EXAMPLE XII

The procedure of Example X is repeated to prepare the same product wherein a molar equivalent amount of 2-methoxy-4-hydroxyphenol is used in place of o-methoxyphenol with comparable results.

Similarly, the corresponding 2-ethoxy and 2-butoxy products are obtained when 2-ethoxy-4-hydroxyphenol and 2-butoxy-4-hydroxyphenol, respectively, are under similar conditions.

EXAMPLE XIII

Phenazine-di-N-oxide

A solution of p-hydroxyphenylacetic acid (5.0 g., 0.034 M) and isobenzofuroxan (4.6 g., 0.034 M) in a 10% methanolic potassium hydroxide solution (100 ml.) is allowed to stand at room temperature for four days. Filtration of the resulting slurry yielded orange colored needles which were triturated with 1 N HCl, filtered and dried to give product having a melting point 193–195° C. This compound was identified as phenazine-di-N-oxide by its physical measurements as well as by a mixed melting point test with an authentic sample.

MIC against *Past. multocida* is 25 mcg./ml.

EXAMPLE XIV

The procedure of Example XIII is repeated to prepare the same product, namely, phenazine-di-N-oxide, wherein molar equivalent amounts of the following phenol reagents are used in place of p-hydroxyphenylacetic acid with comparable results:

Phenol reagents

Methyl-p-hydroxyphenylacetate
n-Butyl-p-hydroxyphenylacetate
p-Methylphenol
p-Ethylphenol
p-n-Butylphenol

EXAMPLE XV 2-methoxyphenazine-di-N-oxide

A solution containing p-methoxyphenol (6.2 g., 0.048 M), isobenzofuroxan (6.5 g., 0.048 M) and 100 ml. of a 5% methanolic potassium hydroxide solution is allowed to stand at room temperature for three days. The resulting slurry is then filtered to give crude product which is recrystallized from methanol to provide a red solid having a melting point 184° C. dec.

Analysis.—Calculated for $C_{13}H_{10}N_2O_3$ (percent): C, 64.45; H, 4.16; N, 11.57. Found (percent): C, 64.56; H, 4.37; N, 11.68.

EXAMPLE XVI

The procedure of Example XV is repeated to prepare the products designated herein below wherein molar equivalent amounts of the indicated phenol reagents are used in place of p-methoxyphenol.

| Phenol reagent | Product |
|---|---|
| p-Ethoxyphenol | 2-ethoxyphenazine-di-N-oxide |
| p-n-Propoxyphenol | 2-n-propoxyphenazine-di-N-oxide |
| p-n-Butoxyphenol | 2-n-butoxyphenazine-di-N-oxide |

EXAMPLE XVII 2-aminophenazine-di-N-oxide

To a solution containing isobenzofuroxan (13.6 g., 0.1 M), p-aminophenol (11.0 g., 0.1 M) and 150 ml. of tetrahydrofuran and 25 ml. of methanol is added 25 ml. of methanol containing one gram of sodium methoxide. The reaction mixture becomes warm and within 15 minutes a dark solid begins to precipitate. This solid product is filtered after two hours and subsequently recrystallized from trifluoroacetic acid to yield a product having a melting point 219° C. dec.

Analysis.—Calculated for $C_{12}H_9O_2N_3$ (percent): C, 63.43; H, 3.99; N, 18.49. Found (percent): C, 63.54; H, 3.98; N, 18.30.

MIC against *Staph. aureus* is 0.78 mcg./ml.

EXAMPLE XVIII 1-methyl-2,3-di-hydroxyphenazine-di-N-oxide

A solution containing 2-hydroxy-3-methylphenol (5.0 g., 0.04 M), isobenzofuroxan (5.4 g., 0.04 M) and 100 ml. of tetrahydrofuran is saturated with ammonia. The resulting reaction mixture was reduced to a small volume by a stripping procedure in vacuo and the resulting dark solid was treated with 1 N HCl. The solid precipitate was removed by filtration and repurified by dissolution in a saturated sodium bicarbonate solution, filtered and reprecipitated by acidification. The reddish solid product has a melting point 235° C.

Analysis.—Calculated for $C_{13}H_{10}N_2O_4$ (percent): C, 60.50; H, 3.88; N, 10.85. Found (percent): C, 60.77; H, 4.28; N, 11.38.

EXAMPLE XIX

The procedure of Example XVIII is repeated wherein molar equivalent amounts of the phenol reagents indicated herein below are used instead of 2-hydroxy-3-methylphenol to provide the products shown.

| Phenol reagent | Product |
|---|---|
| 2-hydroxy-3-ethylphenol | 1-ethyl-2,3-dihydroxyphenazine-di-N-oxide. |
| 2-hydroxy-3-n-propylphenol | 1-n-propyl-2,3-dihydroxyphenazine-di-N-oxide. |
| 2-hydroxy-3-n-butylphenol | 1-n-butyl-2,3-dihydroxyphenazine-di-N-oxide. |

EXAMPLE XX

2-hydroxy-3-carboxyphenazine-di-N-oxide

A solution containing isobenzofuroxan (13.6 g., 0.10 M), 2-carboxy-4-hydroxphenol (15.0 g., 0.10 M) and 100 ml. of tetrahydrofuran is saturated with ammonia. The reaction mixture is stirred overnight whereupon the slurry is filtered to give product in the form of its ammonium salt. The free acid is then obtained by treating this salt with 1 N HCl solution. The product was obtained in about 70% yield.

EXAMPLE XXI

2-hydroxy-3-carbomethoxyphenazine-di-N-oxide

A solution containing 2-carbomethoxy-4-hydroxyphenol (5.0 g., 0.029 M), isobenzofuroxan (4.0 g., 0.029 M) and 100 ml. of tetrahydrofuran is saturated with ammonia and the reaction mixture is stirred at room temperature overnight. The resulting mixture is then stripped to dryness and after trituration with 1 N HCl was recrystallized from a methanol-ether mixture to give a product having a melting point 204–205° C.

*Analysis.*—Calculated for $C_{14}H_{10}N_2O_5$ (percent): C, 58.75; H, 3.52; N, 9.79. Found (percent): C, 58.62; H, 3.96; N, 10.09.

EXAMPLE XXII

The procedure of Example XXI is repeated wherein molar equivalent amounts of the phenol reagents listed herein below are used in place of 2-methoxycarbonyl-3-hydroxyphenol to provide the products shown. Comparable results are obtained:

| Phenol reagent | Product |
| --- | --- |
| 2-carbethoxy-3-hydroxyphenol | 2-hydroxy-3-carbethoxyphenazine-di-N-oxide. |
| 2-carbo-n-butoxy-3-hydroxyphenol | 2-hydroxy-3-carbo-n-butoxyphenazine-di-N-oxide. |

EXAMPLE XXIII

2-hydroxy-3-chlorophenazine-di-N-oxide

The procedure of Example XXI is repeated for the preparation of the subject compound wherein a molar equivalent amount of 2-chloro-4-hydroxyphenol is used in lieu of 2-carbomethoxy-4-hydroxyphenol with comparable results.

Similarly, the analogous 3-bromo, 3-iodo and 3-fluoro products are obtained when 2-bromo-4-hydroxyphenol, 2-iodo-4-hydroxyphenol and 2-fluoro-4-hydroxyphenol, respectively, are the phenol reagents.

EXAMPLE XXIV

1-3-dihydroxyphenazine-di-N-oxide

A solution containing 3,5-dihydroxyphenol (5.6 g., 0.049 M), isobenzofuroxan (6.68 g., 0.049 M) and 40 ml. of a 5% methanolic potassium hydroxide solution is allowed to stand at room temperature for about 24 hours. An equal amount of water is then added and the resulting solution is acidified with concentrated HCl. The slurry is filtered to give product having a melting point 220° C. dec.

EXAMPLE XXV

2,3-methylenedioxyphenazine-di-N-oxide

To a solution containing sodium metal (2.3 g., 0.1 M) dissolved in 50 ml. of methanol is added 3,4-methylenedioxyphenol (13.8 g., 0.1 mole) dissolved in 100 ml. of methanol. Isobenzofuroxan (13.6 g., 0.1 M) in 50 ml. of methanol is then added dropwise. Upon completion of addition, the reaction mixture is stirred for an additional 3 hours and the solid product which precipitates is then filtered. This product is crystallized from a trifluoroacetic acid methanol mixture to yield a product having a melting point 199–200° C.

*Analysis.*—Calculated for $C_{13}H_8O_4N_2$ (percent): C, 60.94; H, 3.15; N, 10.93. Found (percent): C, 60.80; H, 3.16; N, 10.90.

MIC against *Staph. aureus* is 12.5 mcg./ml.

EXAMPLE XXVI

2,3-trimethylenephenazine-di-N-oxide

A solution containing 3,4-trimethylenephenol (13.4 g., 0.1 M) sodium methoxide (1 g.) and 150 ml. of methanol is refluxed for 2 hours, cooled and the solid product which precipitates is filtered. The product has a melting point 197° C. dec.

EXAMPLE XXVII

The procedure of Example XXVI is repeated wherein the phenol reagent listed herein below in stoichiometric equivalent amounts are used in place of 3,4-trimethylenephenol and the products indicated are obtained in good yields:

| Phenol reagent | Product |
| --- | --- |
| 3,4-tetramethylenephenol | 2,3-tetramethylenephenazine-di-N-oxide. |
| 3,4-hexamethylenephenol | 2,3-hexamethylenephenazine-di-N-oxide. |
| 3,4-octamethylenephenol | 2,3-octamethylenephenazine-di-N-oxide. |

EXAMPLE XXVIII

5-pyrido[3,2-a]phenazinol-di-N-oxide

To a solution containing 8-hydroxyquinoline (14.5 g., 0.1 M) and 100 ml. of methanol is added a solution of sodium methoxide (5.4 g., 0.1 M) in 50 ml. of methanol. The reaction mixture is heated almost to reflux before isobenzofuroxan (13.6 g., 0.1 M) in 100 ml. of methanol is added over a 10 minute period. The mixture is then refluxed for an additional 2½ hours, cooled and the solid product which precipitates is filtered. Recrystallization from a mixture of trifluoroacetic acid-acetic acid yields a product having a melting point 242° C. dec.

*Analysis.*—Calculated for $C_{15}H_9O_3N_3$ (percent): C, 64.51; H, 3.25; N, 15.05. Found (percent): C, 64.48; H, 3.29; N, 14.93.

MIC against *Strep. pyogenes* is 12.5 mcg./ml.

EXAMPLE XXIX

Benzo-[a]-phenazine-di-N-oxide

To a hot solution containing β-naphthol (14.4 g., 0.1 M) sodium methoxide (5.4 g., 0.1 M) and 150 ml. of methanol is added a solution of isobenzofuroxan (13.6 g., 0.1 M) in 100 ml. of methanol. The reaction mixture is refluxed for 5–10 minutes and the solid material which precipitates is filtered. Recrystallization from chloroform yields the product having a melting point 175–176° C.

*Analysis.*—Calculated for $C_{10}H_{10}O_2N_2$ (percent): C, 73.27; H, 3.84; N, 10.68. Found (percent): C, 72.73; H, 4.13; N, 11.15.

MIC against *Staph. aureus* is 3.12 mcg./ml.

EXAMPLE XXX

The procedure of Example XXIX is repeated wherein a molar equivalent amount of α-naphthol is used in place of β-naphthol to provide a mixture of products. One is the same product as obtained by the procedure of Example XXIX. The second is the 3-hydroxy derivative of that product having the formula:

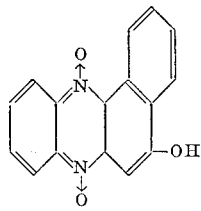

M.P. 250–253° C. dec.

11

*Analysis.*—Calculated for $C_{10}H_{10}O_3N_2$ (percent): C, 69.06; H, 3.62; N, 10.07. Found (percent): C, 69.20; H, 3.56; N, 10.11.

MIC against *Staph. aureus* is 50 mcg./ml.

EXAMPLE XXXI

The procedure of Example XXIX is repeated wherein a molar equivalent amount of 1,4-dihydroxy naphthalene is used in place of β-naphthol to provide as the solid product the 3-hydroxy derivative described in Example XXX.

What is claimed is:

1. A process for the preparation of phenazine-di-N-oxides which comprises reacting an isobenzofuroxan with a phenol in the presence of a base.

2. The process of claim 1 wherein said base is selected from the group consisting of ammonia, organic amines, alkali metal hydroxides, alkali metal alkoxides and alkali metal hydrides.

3. The process of claim 1 wherein the reaction is carried out in a solvent.

4. A process as claimed in claim 1 for the preparation of 2-hydroxyphenazine-di-N-oxide which comprises reacting isobenzofuroxan with a phenol selected from the group consisting of phenol, p-hydroxyphenol and m-alkyloxyphenols, said alkyl group containing from 1 to 4 carbon atoms in the presence of alkali metal alkoxide.

5. The process of claim 4 wherein said alkali metal alkoxide is sodium methoxide and the reaction is carried out in tetrahydrofuran.

6. A process as claimed in claim 1 for the preparation of 2,3-dihydroxyphenazine-di-N-oxide which comprises reacting isobenzofuroxan with a phenol selected from the group consisting of o-hydroxyphenol, 2,4-dihydroxyphemol and 2-hydroxy, 4-halo (F, Cl, Br) phenols in the presence of an alkali metal alkoxide.

7. The process of claim 6 wherein said alkali metal alkoxide is sodium methoxide and the reaction is carried out in methanol.

8. A process as claimed in claim 1 for the preparation of a 2-hydroxy, 3-alkyloxyphenazine-di-N-oxide which comprises reacting isobenzofuroxan with a phenol selected from the group consisting of 2-alkyloxyphenol and 2-alkyloxy-4-hydroxyphenol, said alkyl group containing from 1 to 4 carbon atoms in the presence of an alkali metal alkoxide.

9. The process of claim 8 wherein said alkali metal alkoxide is sodium methoxide and the reaction is carried out in methanol.

10. A process as claimed in claim 1 for the preparation of phenazine-di-N-oxide which comprises reacting isobenzofuroxan with a phenol selected from the group consisting of p-alkylphenol, p-hydroxyphenylacetic acid and p-hydroxyphenylacetic acid esters, said alkyl and ester groups containing from 1 to 4 carbon atoms in the presence of an alkali metal alkoxide.

11. The process of claim 10 wherein said alkali metal alkoxide is sodium methoxide and the reaction is carried out in methanol.

12. A process as claimed in claim 1 for the preparation of 2-alkyloxy phenazine-di-N-oxides which comprises reacting isobenzofuran with a p-alkyloxyphenol wherein said alkyl group contains from 1 to 4 carbon atoms in the presence of an alkali metal alkoxide.

13. The process of claim 12 wherein said alkali metal alkoxide is sodium methoxide and the reaction is carried out in methanol.

14. A process as claimed in claim 1 for the preparation of 2-aminophenazine-di-N-oxide which comprises reacting isobenzofuroxan with p-aminophenol in the presence of sodium methoxide.

15. A process as claimed in claim 1 for the preparation of 1-alkyl-2,3-dihydroxyphenazine-di-N-oxides which comprises reacting isobenzofuroxan with a 2-hydroxy-3-alkylphenol wherein said alkyl contains from 1 to 4 carbon atoms in the presence of an alkali metal alkoxide.

16. The process of claim 15 wherein said alkali metal alkoxide is sodium methoxide and the reaction is carried out in methanol.

17. A process as claimed in claim 1 for the preparation of 2-hydroxy-3-carboxyphenazine-di-N-oxide which comprises reacting isobenzofuroxan with 2-carboxy-4-hydroxyphenol in the presence of sodium methoxide.

18. A process as claimed in claim 1 for the preparation of 2-hydroxy - 3 - halophenazine-di-N-oxides which comprises reacting isobenzofuroxan with a 2-halo (F, Cl, Br)-4-hydroxyphenol in the presence of sodium methoxide.

19. The process of claim 18 wherein said 2-halo-4-hydroxyphenol is 2-chloro-4-hydroxyphenol.

20. A process as claimed in claim 1 for the preparation of 2-hydroxy-3-carboalkoxyphenazine-di-N-oxides which comprises reacting isobenzofuroxan with a 2-carboalkoxy-4-hydroxyphenol wherein said alkyl group contains from 1 to 4 carbon atoms in the presence of an alkali metal alkoxide.

21. The process of claim 20 wherein said 2-carboalkoxy-4-hydroxyphenol is carbomethoxy-4-hydroxyphenol, said alkali metal alkoxide is sodium methoxide and the reaction is carried out in methanol.

22. A process as claimed in claim 1 for the preparation of 1,3-dihydroxyphenazine-di-N-oxide which comprises reacting isobenzofuroxan with 3,5-dihydroxyphenol in the presence of sodium methoxide.

23. A process as claimed in claim 1 for the preparation of 2,3-methylenedioxyphenazine-di-N-oxide which comprises reacting isobenzofuroxan with 3,4-methylenedioxyphenol in the presence of sodium methoxide.

24. A process as claimed in claim 1 for the preparation of 2,3-alkylenephenazine-di-N-oxides wherein said alkylene moiety contains from 2 to 8 carbon atoms which comprises reacting isobenzofuroxan with a 3,4-alkylenephenol in the presence of an alkali metal alkoxide.

25. The process of claim 24 wherein said 3,4-alkylenephenol is 3,4-trimethylenephenol, said alkali metal alkoxide is sodium methoxide and the reaction is carried out in methanol.

26. The process of claim 1 wherein said isobenzofuroxan is isobenzofuroxan, said phenol is 8-hydroxyquinoline and said base is sodium methoxide.

27. The process of claim 1 wherein said isobenzofuroxan is isobenzofuroxan and said phenol is a naphthol selected from the group consisting of α-naphthol, β-naphthol and 1,4-dihydroxynaphthalene.

References Cited

UNITED STATES PATENTS 2,891,062  6/1959  Ursprung _____ 260—267

ALEX MAZEL, Primary Examiner

A. M. T. TIGHE, Assistant Examiner

U.S. Cl. X.R.

260—307; 424—250